May 18, 1937.　　　A. RIVERA　　　2,080,785
MECHANICAL DEVICE TO CRIMP SAFETY CAPS ON BOTTLES AND OTHER CONTAINERS
Filed May 26, 1936　　　2 Sheets-Sheet 1

Inventor
Antonio Rivera
By J. McGuire
Atty

May 18, 1937.  A. RIVERA  2,080,785
MECHANICAL DEVICE TO CRIMP SAFETY CAPS ON BOTTLES AND OTHER CONTAINERS
Filed May 26, 1936  2 Sheets-Sheet 2

Inventor
Antonio Rivera

Patented May 18, 1937

2,080,785

UNITED STATES PATENT OFFICE 2,080,785

MECHANICAL DEVICE TO CRIMP SAFETY CAPS ON BOTTLES AND OTHER CONTAINERS

Antonio Rivera, Mexico, D. F., Mexico

Application May 26, 1936, Serial No. 81,922
In Mexico June 3, 1935

4 Claims. (Cl. 226—86)

The present invention is directed generally to an apparatus to attach under pressure caps or inviolable stops to bottles and other containers, and specifically to a head or crimping device to that end; to be mounted, one or a plurality of them, in a suitable frame comprising a support for the bottles or containers to be capped, and means to operate said device, these being either manual or mechanical, receiving the power from any source of energy.

The mechanical device, according to the invention comprises substantially a pressure cone of adjustment that, at the same time, serves as an outside cover to the ensemble itself, being attached to the shaft of the head of the machine; a conic guide for the rim of the mouth of the bottle; a series of jaws loosely attached to a supporting disc or plate attached to said guide; and a cap holder including a suitable disc provided with a concavity in its lower surface. The supporting plate and connected parts have vertical movement inside the outside cover of the adjusting pressure cone; this movement allows the jaws to open or separate from each other on descending to the wide part of the cone and to be closed on ascending to the narrow part, incident to the use of springs which tend to expand by the resiliency of the material; said closing movement of the jaws while closely adjusting the cap to the rim of the bottle, crimps it to an absolutely close fitting. The process will be clearly apparent in the following detailed description.

Therefore, the main object of the invention is to supply a mechanical device whose function is to firmly and closely attach a cap or safety stop to the rim of the mouth of a bottle or any similar container, causing in its peripheric flange a plurality of corrugations for adjustment which firmly attach it to the waist of the neck close to the rim of the bottle.

The advantages of the invention will be made apparent in the following description in which the features of same will be detailed, as well as in the drawings attached to same as an illustration, the same figures referring to the same parts in the five drawings, in which.

Figure 1:
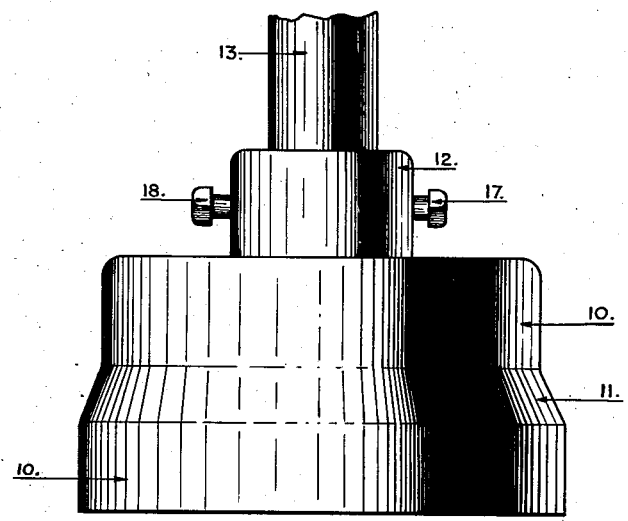
Fig. 1 is a side elevation of the crimping head or mechanical device according to the present invention.
Figure 2:
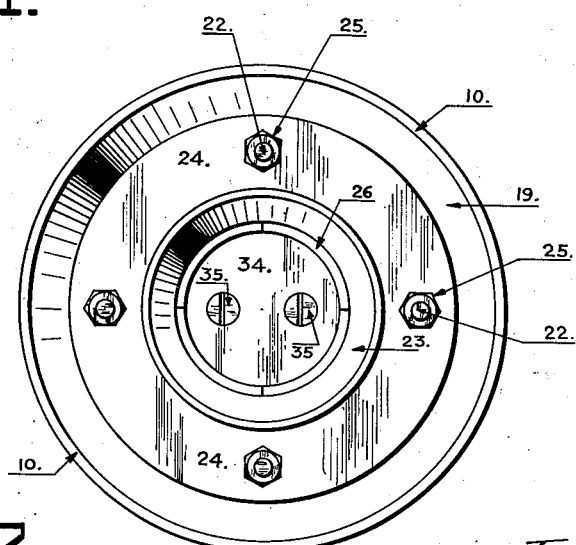
Fig. 2 is a horizontal view taken from the bottom of same.

With specific reference to the attached drawings, the mechanical device according to the invention comprises a pressure adjusting cone 10, which forms, as has been said, the exterior cover of the ensemble and affects the shape of a bell, formed exteriorly to provide a bevelled part 11, and in its upper portion a tubular section 12, into which the shaft 13 of the head of the machine penetrates, said shaft 13 providing a vertical ascending and descending movement. Said shaft 13 is tubular in its lower portion, providing a tubular opening 14 to receive a channelled bolt 16 in one of which grooves is inserted the end of a screw 17, which connects the projecting tube 12 and the head shaft 13 of the machine. The size or length of the groove 16 limits the run of the bolt 15 inside the shaft 13, the movement of which said bolt is transmitted to the inside as will be specified in detail later. Opposite the screw 17 the projecting tube 12 is firmly held to the head shaft 13 by means of the screw 18.

Figure 3:
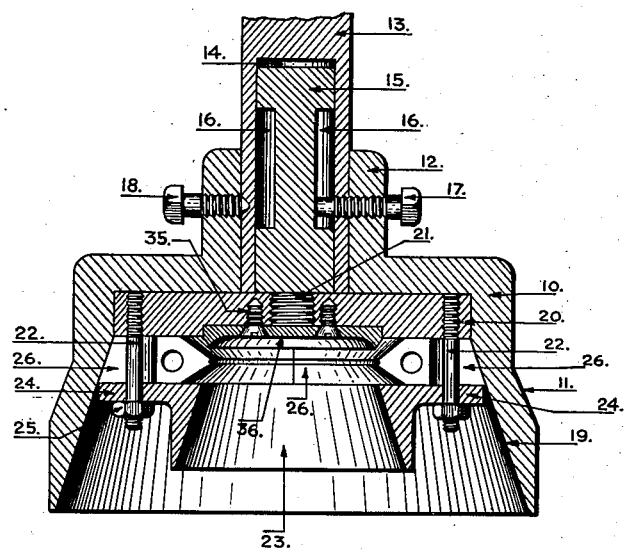
Fig. 3 is a longitudinal section of the same element according to Fig. 1.

Said pressure cone 10 is provided near the lower edge of its lateral wall with a bevel face 19 which reaches more than half of the length of said lateral wall; the cut of which is conic inside as can clearly be seen in Fig. 3 of the drawings, and plays an important part in the operation of the mechanical device.

In the cover 10 is arranged an element in the shape of a disc or flattened cylinder which forms the supporting plate 20, movable within the element 10, by the bolt 15 which is provided at its lower end with a threaded reduction 21 which engages said supporting plate 20. I call element 20 "supporting plate" on account of the fact that all other elements of the device are attached to it and carried by it in its ascending and descending movements.

Through a plurality of threaded bolts 22, a conic guide 23 is firmly attached to the supporting plate, a flange 24 of the guide 23 receiving the threaded bolts 22 which make the attachment being screwed into the element 20 and by means of terminal nuts 25, support the flange 24 and consequently the conic guide 23. This last element, as its name implies, operates as a guide for the end of the neck of the bottle to be capped, guiding the edge of the neck to the exact position where the cap may be firmly pressed and attached.

Figure 4:
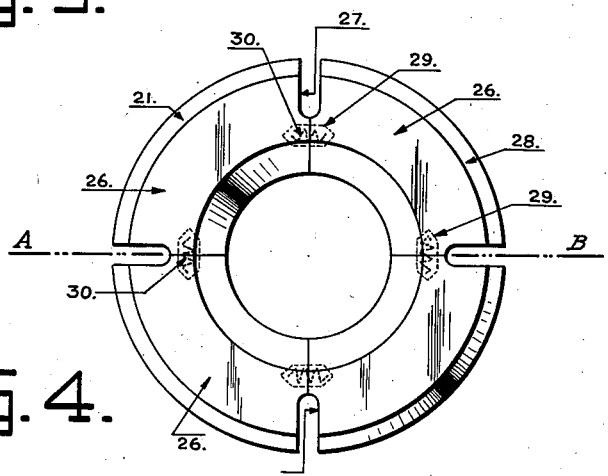
Fig. 4 is a horizontal view of the plurality of jaws as they are arranged inside the element that serves as an outside cover, showing said jaws entirely closed, tight to each other, and the springs inside of them, with a dotted line.

Between the supporting plate 20 and the guide 23 and the flange 24, there is movably fixed and with certain looseness, and always inside the pressure cone 10, a set of jaws 26 which interfit the threaded bolts 22 by means of oblong cuts which each jaw has on both sides as is clearly shown in Fig. 4 of the drawings. The aforesaid jaws 26 have a special shape, being cut both radially and convergently, in such a way that all of them when close together form a perfect circular disc. Said jaws could be two, three, four or more according to whether it is desired that the cap be attached to the rim of the bottle by two, three, four or more crimps. (The attached drawings illustrate as an example an arrangement of the holding head of pressure caps provided with a plurality of four jaws, and therefore the caps will be adjusted by four crimpings; but I desire it to be understood that it is entirely practicable to completely vary the number of said jaws from two on).

Figure 5:
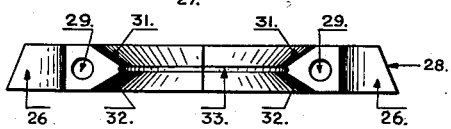
Fig. 5 is a cross section on line A—B in Fig. 4, in which can be clearly appreciated the outlines of said jaws.

Each jaw 26 is provided in its outside edge with a beveled cut which has an oblique profile 28 in such a way that properly fitted in the ensemble forms a circular element which has a truncated conic section as can be seen in Fig. 5 of the drawings.

Each one of the elements 26 which form the jaws is provided in opposite lateral sides with cylindrical openings 29 to receive springs 30 to separate the jaws 26 from each other, opening or separating them as far as permitted by the bevel cut 19 of the outside cover or bell 10 within which they are disposed. When the jaws are depressed by the supporting plate 20, said cut will allow them to open or separate and compel them to close when moving upwardly. Each one of the jaws 26 is cut in its inside edge in a semicircular form in such a way that when all of them are together they form a perfect circle, as can be seen in Fig. 4 of the attached drawings. Said inside edges have, in addition to the angular sections as a result of the bevel cuts 31 and 32, a groove 33 which upon pressing on the cap bends its flange, adjusting it to the waist in the brim of the bottle at the same time that the separation of the jaws and afterwards the pressure when they close cause in the same bent flange a plurality of adjusting crimpings.

At the center of the element 20 and in a cylindrical cavity to that end disposed, there is the holder of the cap 34 removably attached by means of screws 35. This piece 34 is constituted by a disc provided with a cavity 36 in which fits and at the same time forms a guide for the upper surface of the cap at the moment that its flange is pressed to the brim of the bottle.

I wish to specially mention the fact that with this arrangement of my invention in its operation works properly located in a suitable frame either individually or in a plurality of two or more; and that it also works either by the interior mechanism of my arrangement with an up and down movement or because the bottle pushes it by means of a suitable support, in which case the support will be the one that has a vertical push; in both ways the work will be absolutely the same as can easily be seen by those skilled in the art.

It must be also understood that certain variations or modification in detail could be made, provided it is always within the scope of the following claims and therefore the invention is not limited to the illustrated and specified details.

What I claim as new is:

1. A machine for applying bottle caps to bottles, comprising a housing member having a flaring depending wall, the inner surface of which is upwardly and inwardly inclined for the greater portion of its length, a pressure plate slidably fitted within the housing above the inclined surface thereof, a bottle guide carried by the plate, a bottle cap pressure element movably mounted between the pressure plate and the bottle guide, said bottle cap pressure element being of sectional form with each section having an inner cap engaging margin and an outer inclined margin, the inner margins of the sections when in normal position constituting a substantially uninterrupted circular form, the inclined outer margins of the sections bearing against the inclined wall of the housing, and means for permitting relative vertical movement of the pressure plate and parts carried thereby axially of the housing to permit radial movement of the sections of the bottle cap pressure element to provide for the insertion of the bottle and applied cap, the opposite relative movement of the housing and pressure plate causing the inclined wall of the housing and the inclined outer margins of the bottle cap pressure element sections to cooperate with a camming action to force the inner margins of the sections onto the bottle cap with a crimping effect.

2. A construction as defined in claim 1, wherein the inner margins of the sections of the bottle cap pressure element are inclined in both directions from a transverse median line.

3. A construction as defined in claim 1, wherein the means for securing the bottle guide to the pressure plate are utilized as guide means for the sections of the bottle cap pressure element.

4. A construction as defined in claim 1, wherein the pressure plate in line with the opening at the inner margin of the sections of the bottle cap pressure element is provided with a removable disk formed with a cavity to position and limit the upward movement of the cap on the bottle during the operation of the apparatus.

ANTONIO RIVERA.